(No Model.) 2 Sheets—Sheet 1.
I. FRÉCHETTE.
CAR AXLE LUBRICATOR.
No. 345,228. Patented July 6, 1886.
*Fig. 1.*
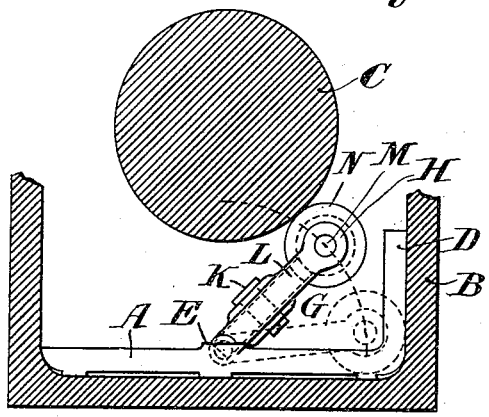
*Fig. 4.*
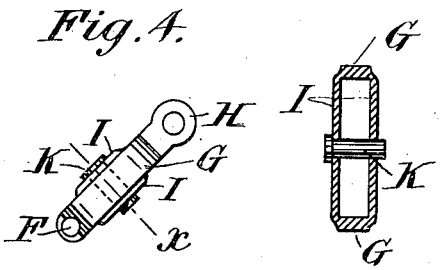
*Fig. 6.*
*Fig. 2.*
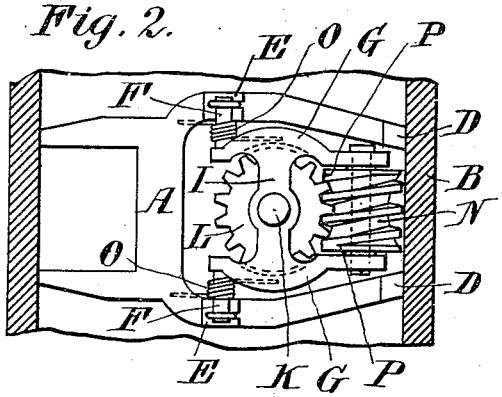
*Fig. 5.* *Fig. 7.*
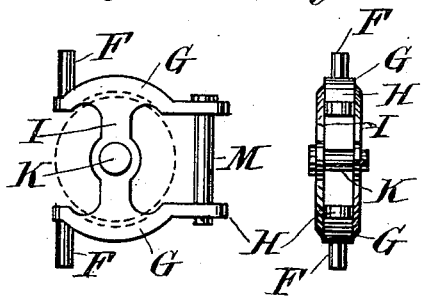
*Fig. 3.*
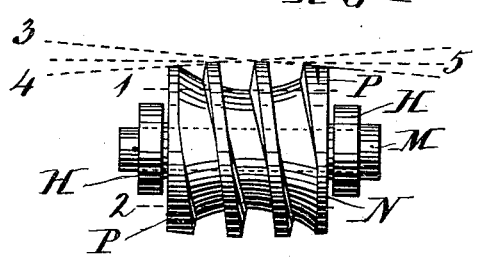
Witnesses
H. Irwin
Jos Martin
Inventor
Isaïe Fréchette
By his Attorney
Charles G. C. Simpson (No Model.) 2 Sheets—Sheet 2.

I. FRÉCHETTE.
CAR AXLE LUBRICATOR.

No. 345,228. Patented July 6, 1886.

Witnesses.
H. Irwin.
Jos Martin

Inventor:
Isaac Fréchette
By his Attorney
Charles G. C. Simpson

UNITED STATES PATENT OFFICE.

ISAIE FRÉCHETTE, OF ST. HYACINTHE, QUEBEC, CANADA, ASSIGNOR TO THE NATIONAL AUTOMATIC LUBRICATOR COMPANY, OF PORTLAND, ME.

CAR-AXLE LUBRICATOR.

SPECIFICATION forming part of Letters Patent No. 345,228, dated July 6, 1886.

Application filed February 13, 1886. Serial No. 191,841. (No model.)

*To all whom it may concern:*

Be it known that I, ISAIE FRÉCHETTE, of the city of St. Hyacinthe, in the county of St. Hyacinthe, Province of Quebec, Canada, have invented new and useful Improvements in Lubricators; and I do hereby declare that the following is a full, clear, and exact description of the same.

This invention has reference to improvements in lubricators for the journals of axles of vehicles, but more particularly those of railway-cars, and I shall confine my description of it to such use, by which description it will be readily understood how my invention may be applied to other journals of axles, &c., which revolve.

In most of the mechanical lubricators at present invented the parts actuated by the journal of the axle are operated with such rapid motion that they not only lubricate the said journal, but also so liberally spatter or disperse the fluid lubricant about within the axle-box that it flows out at the joint of the cover of the axle-box, unless made "water-tight," and particularly at the orifice through which the axle enters the axle-box, thus causing not only a loss of a certain amount of the lubricant, but also an accumulation of sand and dust, &c., about the outside of the axle-box. By my present invention a mechanism is provided which is capable of supplying the necessary amount of lubricant to the journal, while the objection above mentioned is in a great measure or entirely overcome.

The particular features or combinations of parts which form my present invention will be hereinafter fully set forth and claimed.

Figure 8:
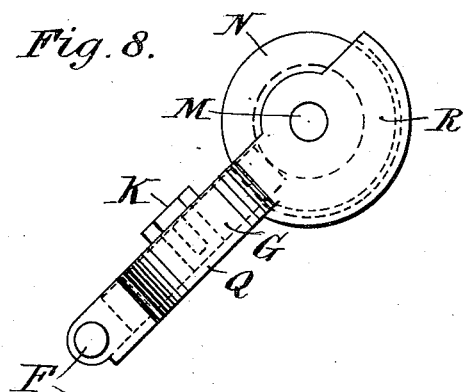
Figure 11:
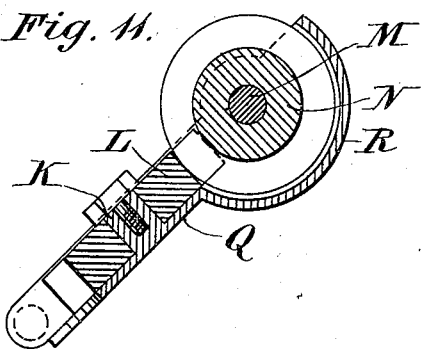
Figure 9:
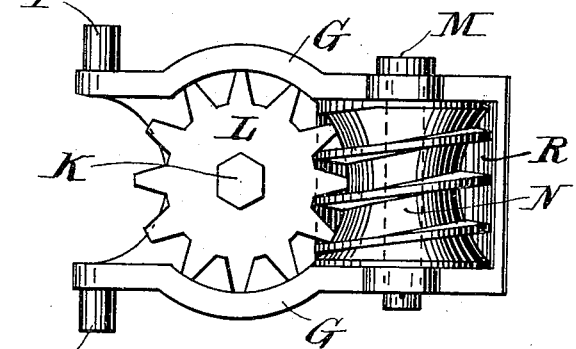
Figure 10:
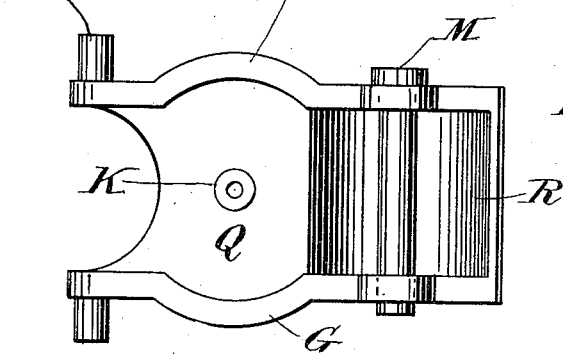

In the drawings hereunto annexed similar letters of reference indicate like parts, and Figure 1 is a front elevation of a lubricator embodying my invention. Fig. 2 is a plan of the lubricator shown in Fig. 1. Fig. 3 is a detached view of the screw-threaded pulley. Fig. 4 is a side elevation of a pivoted frame for holding the lubricating wheel and pulley. Fig. 5 is a plan of the frame shown in Fig. 4. Fig. 6 is a section on line *x*, Fig. 4. Fig. 7 is an end elevation of the parts shown in Fig. 5. Fig. 8 is a side elevation of a modification of the swinging frame G, with pulley N and wheel L shown in relation therewith. Fig. 9 is a plan of the parts shown in Fig. 8. Fig. 10 is a plan of the same as Fig. 9 with pulley and wheel removed. Fig. 11 is a sectional elevation of parts shown in Fig. 9.

Letter A represents a frame made, substantially as shown, to fit loosely within the lower part of the axle-box B.

C is the axle, shown at the relative position with the bottom of the axle-box that they are ordinarily placed in.

The upward extensions D of the frame A are for the purpose of steadying the lower part of it upon the bottom of the axle-box; or, in other words, to prevent any danger of the frame A becoming canted up or raised from the bottom of the axle-box B by the action of the working parts attached upon it, the whole as above described being as heretofore in use.

On the frame A bearings E are formed for receiving and holding in place the pivots or trunnions F of a swinging frame G. This frame G is provided with said trunnions F, eyes H, and side pieces, I, preferably made integral. Through suitable openings in the side pieces, I, a pin, K, serving to hold and forming an axis upon which a toothed wheel, L, revolves. Through the eyes H a pin, M, is passed, forming an axis for a screw-threaded pulley, N, to revolve on. The said screw-threaded pulley N and teeth of the wheel L are properly arranged to intermesh with each other, as in an ordinary screw-and-pinion motion. In this case, however, I prefer to cut the thread on the pulley N with a decreasing depth agreeing with the periphery of the wheel L, instead of cutting a thread on a parallel spindle, as indicated by the dotted lines 1 and 2 in Fig. 3. By this means I cause the thread to "run out to nothing" (as it is technically called) before it reaches the ends of the pulley, as indicated at P in Figs. 2 and 3. By this means I obviate the formation of any shoulder at the ends of the thread, so that if the pin M should not be parallel to the line 5, which represents the direction of the line of the axle, but should be at an angle to it as to the lines 3 and 4 in Fig. 3, there being no shoulder formed by the ends of the threads, all danger of stopping the revolutions of the pulley N by such shoulders is obviated.

For the purpose of facilitating the bearing of the pulley N upon the axle C, and of revolving it thereby when the axes of the two are not parallel, I propose, furthermore, to make the pulley N in the form of a convex circular spindle zone, as shown in Fig. 3; but, if desired, it may also be made in the form of a plain cylinder, as shown in Fig. 2. The friction of the periphery of the thread upon the pulley N and its bearing—the axle C—is caused by springs O, which have one end attached under or in the frame G, and the other end attached in or under the frame A, as represented. These springs are preferably coil-springs, the coils of which pass around the inner part of the trunnions F. The springs O keep the pulley N pressed against the axle C, yet when it is required to remove the invention from the axle-box B the pulley N may, with the frame G, be turned downward from the position shown in solid lines in Fig. 1 to that indicated by dotted lines. As the pulley N revolves, it causes the wheel L to revolve, and by filling the lower part of the axle-box with fluid lubricating material, the bottom portion of the teeth of the wheel L will be immersed in the fluid lubricant, and by them it will be imparted to the pulley N, and from thence to the axle C. The bottom portion of the axle-box thus forms a reservoir for the fluid lubricant.

If axle-boxes or bearing-boxes are not constructed to form a suitable reservoir in themselves, a lubricating-reservoir will have to be specially provided, substantially as shown in the drawings, and in cases where it is desired to reach a greater distance between the level of the lubricant and axle than can be conveniently reached by one wheel L, two or more wheels may be placed below the first one intermeshing therewith and with one another, and carried and revolving on suitable pivots, similar to K, formed on the frame G, which will in such case be elongated for this purpose. The thread upon the pulley N may be what is called a "double thread," if greater speed of the revolutions of the wheel L is required than what will be given by a single thread. By means of altering the pitch of the threads upon the pulley N and their number, and arranging the teeth on the wheel L, or wheels L, as the case may be to agree therewith, the speed of revolution of the wheel L may be caused to be what is desired to supply the required amount of lubrication to the axle C.

If desired, the frame G may be pivoted to suitable projections or bearings, E, formed on the bottom of the axle-box B, thus dispensing with the frame A, and by having the trunnions F or upper portion of the bearings E removable, the frame G may be detached and removed from the axle-box when desired.

Although, as above mentioned and shown in Figs. 4, 5, 6, and 7, the swinging frame G has been described as constructed of the particular parts and configuration set forth and shown, yet I do not confine myself to the exact configuration so set forth and shown, as the principal requisites of the swinging frame G are that it shall be attached at its lower end, and be provided with axes for the wheel L and pulley N. I have, however, designed another modification of this frame, which, while substantially the same as that hereinabove described, enables the wheel L to lift in the space between its teeth a certain amount of the lubricating fluid and deposit it in an upper reservoir in which the pulley N revolves. This modification is illustrated by Figs. 8, 9, 10, and 11. In this case the sides of the frame G are extended beyond the pin M, and are connected together by a plate, Q, as shown. The upper side of this plate is "faced" to a true plain surface, which surface extends from the "pitch-line" or bottom of the teeth of the wheel L to the same distance at the top of the wheel, so that the teeth of the wheel L project above and below it. The under side of the wheel L, which rests upon the plate Q, is also faced to a true plane surface. The upper part of the plate Q extending above the surface upon which the wheel L rests is curved, forming a semicircular reservoir, R, in which the lower portion of the pulley N revolves. The sides of the frame G in this case are made to fit closely around the teeth of the wheel L, but not so as to obstruct the free revolving of the said wheel.

It will be understood that the sides of the frame G, plate Q, and reservoir R, are preferably made integral, and that the circular part of the reservoir is preferably made concentric with the pulley N. In this modification the wheel N is revolved by the pulley N the same as heretofore, and in so doing it lifts up a portion of the lubricating fluid between its teeth and the side of the frame G, and deposits the same in the reservoir R and onto the pulley N.

What I claim, and wish to secure by Letters Patent, is as follows:

1. In a device for lubricating car-axles and similar journals, the combination of an endless screw, to be rotated by contact with the periphery of the axle or journal to be lubricated, a spring-actuated or yielding support for the screw, and a worm-wheel engaging said screw, substantially in the manner and for the purpose set forth.

2. In a device for lubricating car-axles and similar journals, the combination of a movable supporting-plate, an endless screw journaled in bearings carried by said plate and adapted to be rotated by contact with the periphery of the axle or journal to be lubricated, a worm-wheel pivoted upon the plate to engage said screw, and a spring adapted to carry and press the screw against the car axle or journal, substantially in the manner and for the purpose herein set forth.

3. In a device for lubricating car-axles and similar journals, the combination of a supporting-frame or base-plate, a swinging frame or plate pivoted to said frame, an endless screw mounted to rotate in bearings carried by said plate, a worm-wheel pivoted upon said plate to engage the screw, and a spring upholding the plate and adapted to carry and press the screw against the periphery of the axle or journal to be lubricated, substantially in the manner and for the purpose herein set forth.

4. In a device for lubricating car-axles and similar journals, the combination of a base-plate or frame, a guard attached to the same to prevent it from turning, a swinging plate or frame pivoted to said base, a spring to uphold the swinging plate or frame, an endless screw journaled in bearings carried by said swinging plate or frame to be rotated by contact with the periphery of the axle, and a worm-wheel pivoted upon the swinging plate or frame to engage the screw, the base-plate being adapted to be inserted in the axle-box or reservoir for containing the oil or lubricant, and the worm-wheel so disposed as to be immersed or partially immersed in the oil or lubricant when in position for use, substantially in the manner and for the purpose herein set forth.

5. The combination, with an axle or journal, of an endless screw adapted to be rotated by contact with the periphery of the axle or journal, pivoted arms between which the screw is journaled, a worm-wheel engaging said screw and carried by the arms, a base-plate or support to which said arms are pivoted, a spring adapted to uplift the arms and screw and carry the latter against the axle or journal, and a box or reservoir adapted to contain an oil or lubricant, and from which the worm-wheel is supplied with oil, substantially in the manner and for the purpose herein set forth.

6. The combination of the base-frame R, swinging frame G, springs O, worm-wheel L, and endless screw N, substantially in the manner and for the purpose herein set forth.

7. The combination of the base-frame A, swinging frame G, springs O, worm-wheel L, and screw-threaded lubricating-roller N, provided with a worm which is lost at each end P on the periphery of the roller, substantially in the manner and for the purpose herein set forth.

ISAIE FRÉCHETTE.

Witnesses:
  W. DECARIE,
  CHARLES G. C. SIMPSON.